(12) United States Patent
Kasano et al.

(10) Patent No.: US 9,599,828 B2
(45) Date of Patent: *Mar. 21, 2017

(54) IMAGE DISPLAY APPARATUS

(71) Applicant: Panasonic Corporation, Osaka (JP)

(72) Inventors: Masahiro Kasano, Osaka (JP); Kouki Ichihashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/496,146

(22) Filed: Sep. 25, 2014

(65) Prior Publication Data

US 2015/0077850 A1 Mar. 19, 2015

Related U.S. Application Data

(63) Continuation of application No. PCT/JP2013/002372, filed on Apr. 5, 2013.

(30) Foreign Application Priority Data

Apr. 5, 2012 (JP) .................................. 2012-086132

(51) Int. Cl.
 *G02B 27/22* (2006.01)
 *F21V 8/00* (2006.01)
 (Continued)

(52) U.S. Cl.
 CPC ......... *G02B 27/2214* (2013.01); *G02B 5/045* (2013.01); *G02B 6/0083* (2013.01);
 (Continued)

(58) Field of Classification Search
 CPC .. G02B 27/2214; G02B 5/045; G02B 6/0083; G02B 27/2264; G02B 27/09;
 (Continued)

(56) References Cited

U.S. PATENT DOCUMENTS 5,493,427 A 2/1996 Nomura et al.
6,276,803 B1 * 8/2001 Aoyama ................ G02B 5/045
　　　　　　　　　　　　　　　　　　　　　　348/E5.139
(Continued)

FOREIGN PATENT DOCUMENTS

| JP | 7-72445 | 3/1995 |
| JP | 2004-21072 | 1/2004 |
| JP | 2010-529485 | 8/2010 |

OTHER PUBLICATIONS

International Search Report issued Jul. 2, 2013 in International (PCT) Application No. PCT/JP2013/002372.

*Primary Examiner* — Scott J Sugarman
*Assistant Examiner* — Ibrahima Diedhiou
(74) *Attorney, Agent, or Firm* — Wenderoth, Lind & Ponack, L.L.P.

(57) ABSTRACT

An image display apparatus is provided, which uses a light deflection element capable of deflecting incident light so as to follow the position of an observer, and suppressing reduction in the intensity of light reaching eyes of the observer, regardless of the position of the observer. The light deflection element according to the present disclosure is configured to deflect incident light, and includes: a first optical element that deflects incident light; a second optical element that changes a deflection direction of emitted light by changing a refractive index thereof according to a voltage applied thereto; a first electrode provided on the first optical element side; a plurality of second electrodes provided on the second optical element side; and a control section that controls the voltage applied to the second optical element.

2 Claims, 9 Drawing Sheets

(51) Int. Cl.
*G02F 1/1347* (2006.01)
*H04N 13/04* (2006.01)
*G02F 1/29* (2006.01)
*G02B 5/04* (2006.01)
*G02F 1/1335* (2006.01)

(52) U.S. Cl.
CPC ....... *G02B 27/2264* (2013.01); *G02F 1/1347* (2013.01); *G02F 1/29* (2013.01); *H04N 13/0418* (2013.01); *G02F 2001/133607* (2013.01)

(58) Field of Classification Search
CPC .. G02B 27/0972; G02B 27/22; G02B 27/225; G02B 6/0053; G02B 6/1885; G02F 1/1347; G02F 1/29; G02F 2001/133607; G02F 1/1323; G02F 1/1343; G02F 1/13306; G02F 1/134309; H04N 13/0418; H04N 5/7416; H04N 5/7441; H04N 13/0402; H04N 13/0404; H04N 13/0409; H04N 13/0411; H04N 13/0434; H04N 13/0438; H04N 13/045; H04N 13/0454; H04N 13/0468; H04N 13/0497; H04N 2013/0465; G06F 3/013
USPC ......... 359/463, 242, 15, 462, 464, 156, 419; 345/156; 349/15, 139, 193; 348/42, 51, 348/790; 385/16
See application file for complete search history.

(56) References Cited

U.S. PATENT DOCUMENTS

| | | |
|---|---|---|
| 2003/0235362 A1 | 12/2003 | Sugama et al. |
| 2009/0237576 A1* | 9/2009 | Nelson .................... G02B 3/08 349/15 |
| 2010/0157026 A1 | 6/2010 | Reichelt |
| 2011/0234572 A1* | 9/2011 | Toko ....................... G02F 1/292 345/211 |

* cited by examiner

IMAGE DISPLAY APPARATUS

CROSS-REFERENCE TO RELATED APPLICATION

This application is a Continuation of International Application No. PCT/JP2013/002372, filed on Apr. 5, 2013, which in turn claims the benefit of Japanese Application No. 2012-086132, filed on Apr. 5, 2012, the disclosures of which Applications are incorporated by reference herein.

BACKGROUND

Field

The present disclosure relates to an image display apparatus using a light deflection element that deflects incident light.

Description of the Related Art

Japanese Laid-Open Patent Publication No. 2010-529485 discloses an automatic stereoscopic display that causes images to be stereoscopically viewed by alternately providing light of an image for right eye and light of an image for left eye to the eyes of multiple observers, respectively. In the apparatus disclosed in Japanese Laid-Open Patent Publication No. 2010-529485, optical refraction behavior by deflection means is changed so as to follow a shift of the eye position of each observer. The deflection means is composed of electrowetting cells containing two types of immiscible liquids. When a voltage is applied to the electrowetting cells, the interface between the liquids is changed, whereby a prism function is realized by the electrowetting cells.

SUMMARY

The present disclosure provides an image display apparatus using a light deflection element capable of deflecting incident light so as to follow the position of an observer, and suppressing reduction in the intensity of light reaching the eyes of the observer, regardless of the position of the observer.

An image display apparatus according to the present disclosure includes: an image display panel; a backlight device located on a back surface side of the image display panel; and a light deflection element located between the image display panel and the backlight device, and configured to deflect incident light. The light deflection element includes: a first optical element configured to deflect incident light; a second optical element configured to change a deflection direction of emitted light by changing a refractive index thereof according to a voltage applied thereto; a first electrode provided on the first optical element side; a plurality of second electrodes provided on the second optical element side; and a control section configured to control the voltage applied to the second optical element. The first optical element is located on the backlight device side, and the second optical element is located on the image display panel side. The first optical element is formed by arranging a plurality of deflection members extending in a first direction, in a one-dimensional array along a second direction orthogonal to the first direction. The control section is configured to control voltages applied to the second electrodes such that a first potential difference between the second electrodes and the first electrode which face each other at both edges of each deflection member, is larger than a second potential difference between one of the other second electrodes and the first electrode which face each other at the center of the deflection member.

The present disclosure is effective in realizing an image display apparatus using a light deflection element capable of deflecting incident light so as to follow the position of an observer, and suppressing reduction in the intensity of light reaching the eyes of the observer, regardless of the position of the observer.

DETAILED DESCRIPTION

Hereinafter, an embodiment will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art. Furthermore, in the drawings, principal components may be schematically illustrated for easy understanding.

It is noted that the inventors provide the accompanying drawings and the following description in order that a person skilled in the art may fully understand the present disclosure, and do not intend to limit the subject matter defined by the claims.

<1. Configuration of Image Display Apparatus>

Figure 1:
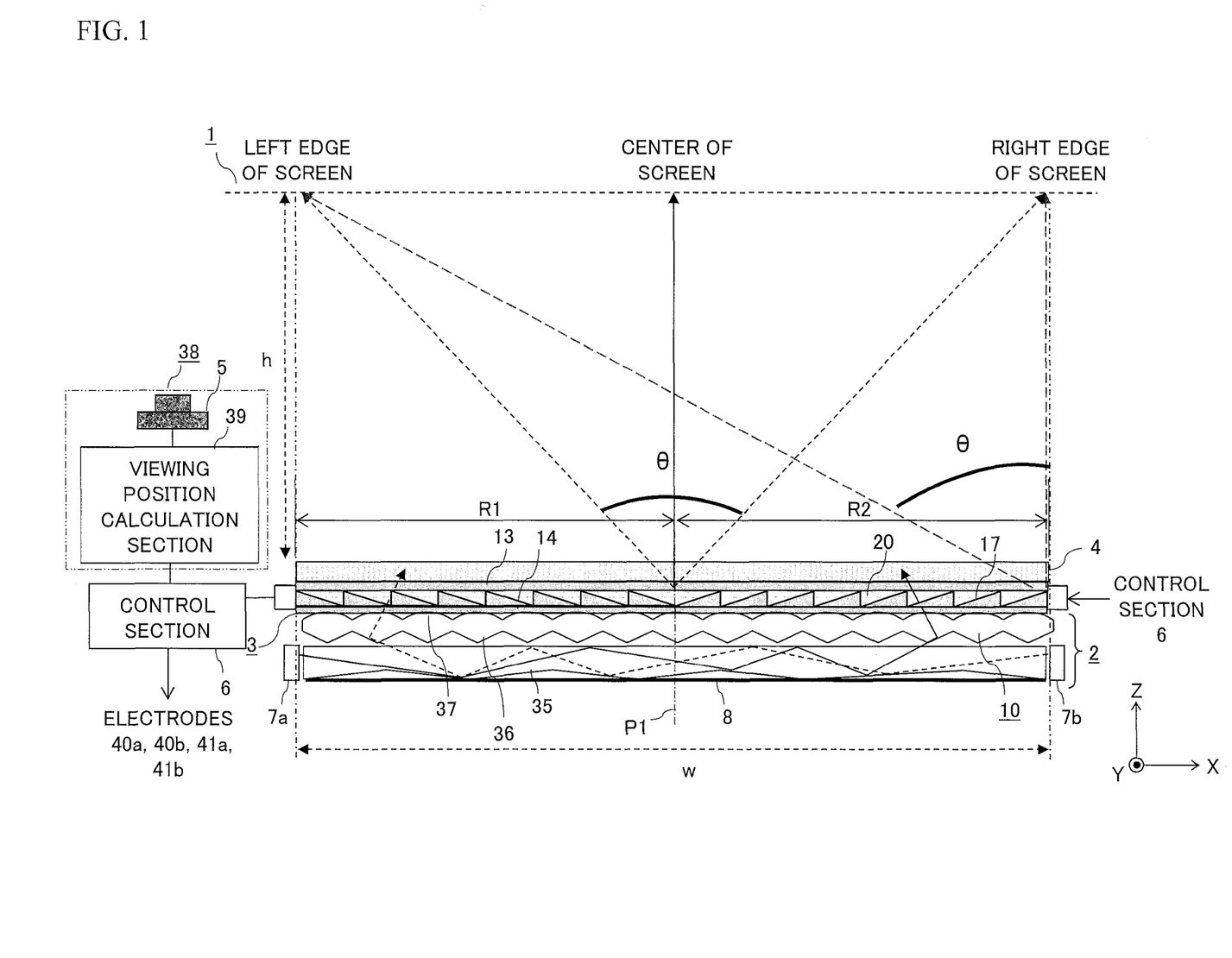
FIG. 1 is a schematic configuration diagram showing an image display apparatus according to an embodiment.
Figure 2:
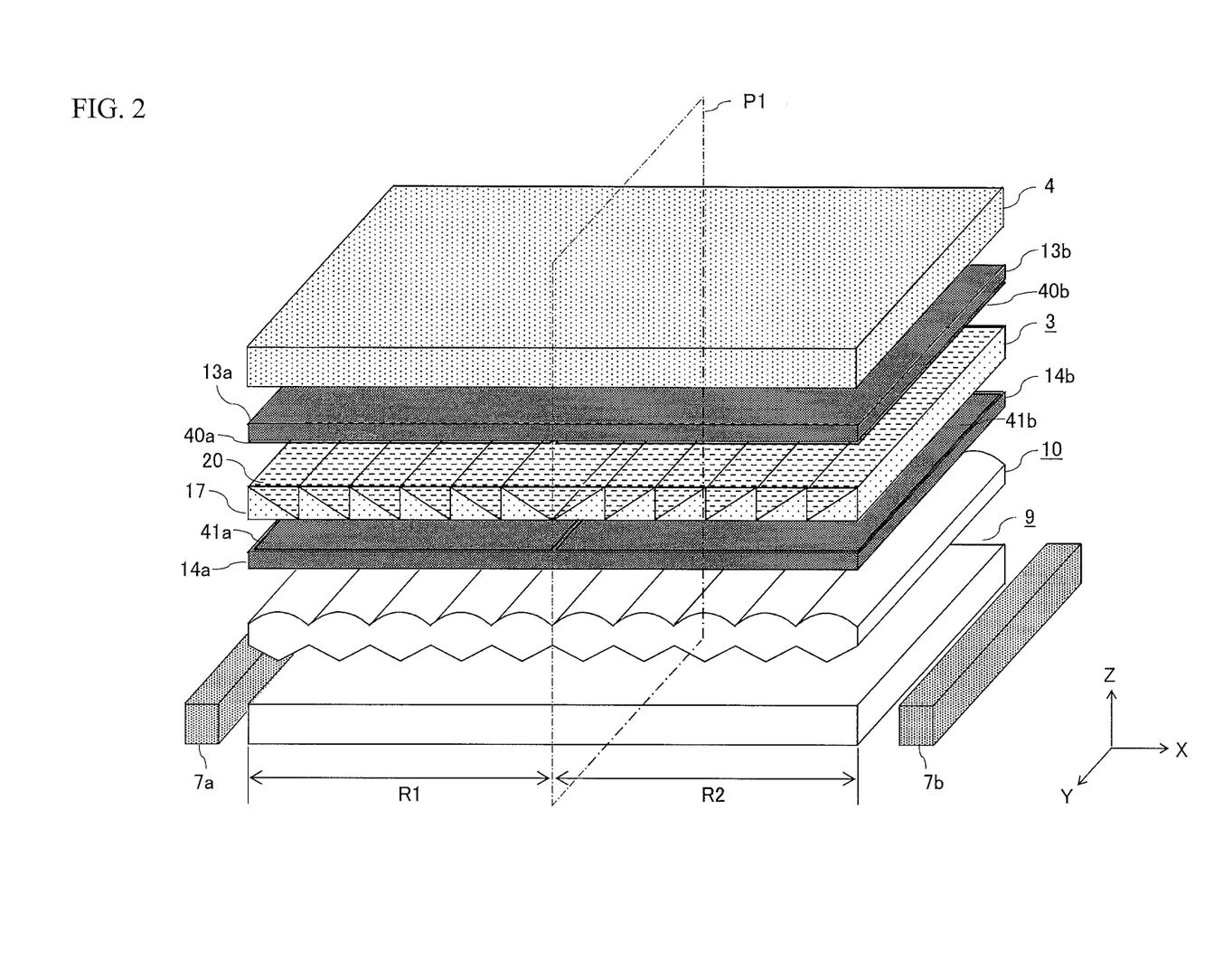
FIG. 2 is an exploded perspective view of a part of the image display apparatus.

FIG. 1 is a schematic cross-sectional view of an image display apparatus 1 according to the embodiment, and FIG. 2 is an exploded perspective view of a part of the image display apparatus 1 shown in FIG. 1. In FIG. 1, illustration of electrodes 40a, 40b, 41a, and 41b shown in FIG. 2 is omitted.

In the present embodiment, a three-dimensional orthogonal coordinate system is set for the image display apparatus 1, and a direction is specified by using coordinate axes. As shown in FIGS. 1 and 2, an X axis direction coincides with a right-left direction (horizontal direction) when an observer faces a display surface of an image display panel 4. A Y axis direction coincides with an up-down direction when the observer faces the display surface of the image display panel 4. A Z axis direction coincides with a direction perpendicular to the display surface of the image display panel 4. Here, "facing" means that the observer is present directly in front of the display surface such that, for example, when a letter of "A" is displayed on the display surface, the observer sees the letter of "A" from a correct direction. In addition, FIGS. 1 and 2 correspond to views as seen from above the image display apparatus 1. Thus, the left side in FIGS. 1 and 2 corresponds to the right side of the display screen when an observer sees the display screen.

The image display apparatus 1 includes a light source switching type backlight 2 (an example of a backlight device), a liquid crystal prism element 3, the image display panel 4 that displays an image for right eye and an image for left eye while alternately switching between the image for right eye and the image for left eye, a position detection section 38 that detects the position of an observer who uses the image display apparatus 1, and a control section 6 that controls a liquid crystal driving voltage outputted to a liquid crystal prism element 3 on the basis of information of the detected position of the observer. Hereinafter, each component will be described in detail.

The backlight 2 includes light sources 7a and 7b facing each other, a reflection film 8, a light guide plate 9, and a light control film 10. The reflection film 8 is provided on a lower surface side of the light guide plate 9, and the light control film 10 is provided on an upper surface side of the light guide plate 9.

The light sources 7a and 7b are arranged so as to extend along a pair of side surfaces, respectively, of the light guide plate 9, and face each other in the X axis direction. The light source 7a is located at the left side surface of the light guide plate 9, and the light source 7b is located at the right side surface of the light guide plate 9. Each of the light sources 7a and 7b has a plurality of LED elements arranged in the Y axis direction. Each of the light sources 7a and 7b alternately repeats lighting-up and going-out in synchronization with switching between the image for right eye and the eye image for left eye that are displayed on the image display panel 4. In other words, when the image display panel 4 displays the image for right eye, the light source 7a lights up and the light source 7b goes out, and when the image display panel 4 displays the image for left eye, the light source 7a goes out and the light source 7b lights up.

Light emitted from the light sources 7a and 7b spreads in the light guide plate 9 while being repeatedly totally reflected at the upper surface and the lower surface of the light guide plate 9. Light having an angle exceeding the total reflection angle within the light guide plate 9 is emitted from the upper surface of the light guide plate 9. The lower surface of the light guide plate 9 is composed of a plurality of inclined surfaces 35 as shown in FIGS. 1 and 2. By these inclined surfaces 35, light propagating in the light guide plate 9 is reflected in various directions, and thus the intensity of the light emitted from the light guide plate 9 becomes uniform across the entire upper surface.

The reflection film 8 is provided on the lower surface side of the light guide plate 9. Light having an angle exceeding the total reflection angles of the inclined surfaces 35 provided in the lower surface of the light guide plate 9 is reflected by the reflection film 8, enters the light guide plate 9 again, and is eventually emitted from the upper surface. The light emitted from the light guide plate 9 is incident on the light control film 10.

On a lower surface of the light control film 10, a plurality of prisms 36 each having a triangular cross section and a ridge line extending in the Y axis direction are aligned along the X axis direction. In other words, on the lower surface of the light control film 10, the prisms 36 each having a triangular cross section are arranged in a one-dimensional array. In addition, on an upper surface of the light control film 10, a plurality of cylindrical lenses 37 extending in the Y axis direction are aligned along the X axis direction. In other words, a lenticular lens is formed on the upper surface of the light control film 10.

The light incident on the lower surface of the light control film 10 is refracted toward the Z axis direction by the prisms 36, converged by the lenticular lens located on the upper surface, and is incident on the liquid crystal prism element 3.

Figure 3:
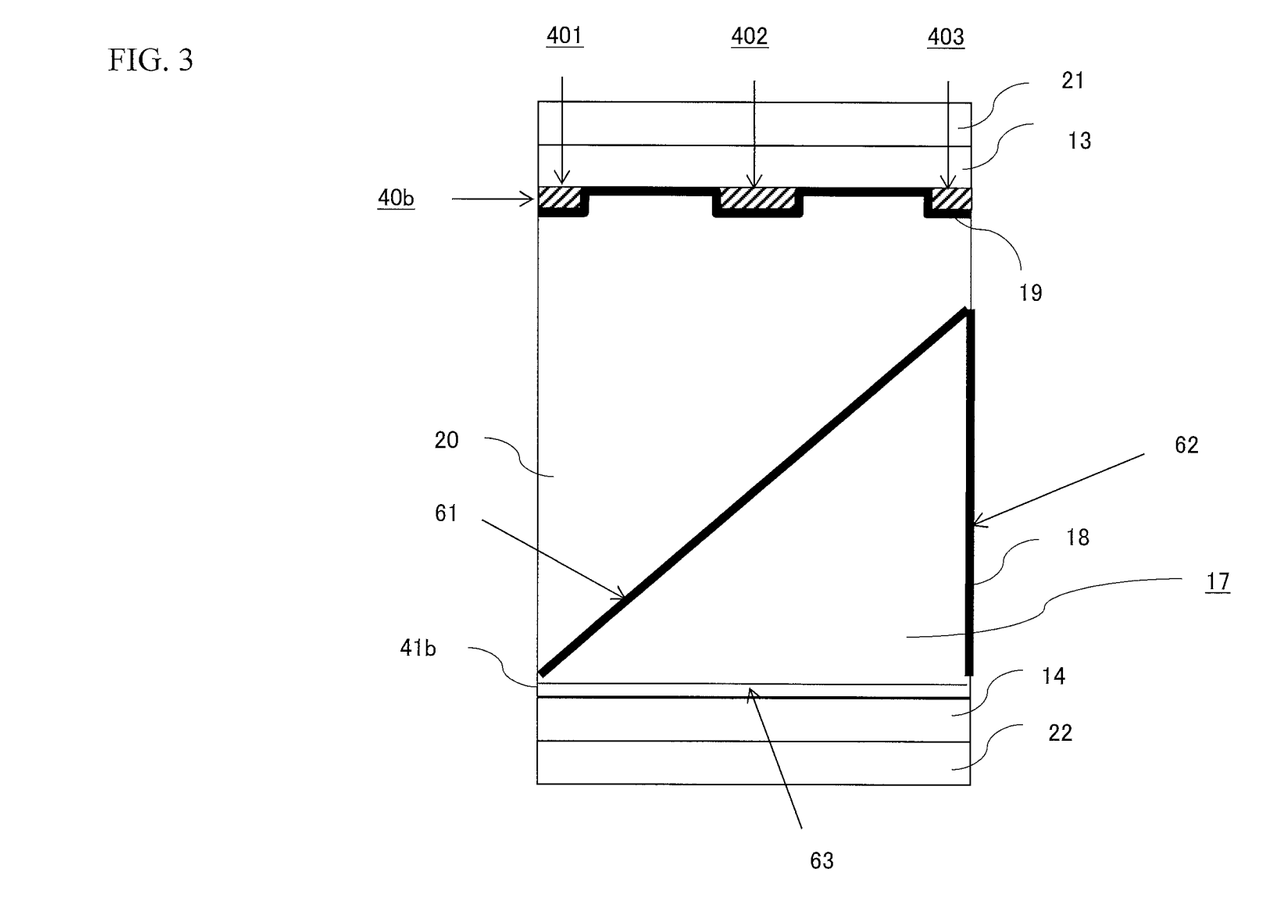
FIG. 3 is a partially enlarged view of a liquid crystal prism element.

FIG. 3 is a partially enlarged view of the liquid crystal prism element 3 shown in FIG. 1. Specifically, FIG. 3 is an enlarged view of a part of a right-side area of the liquid crystal prism element 3 shown in FIG. 1. Hereinafter, the liquid crystal prism element 3 will be described in detail with reference to FIGS. 1 to 3 in combination.

The liquid crystal prism element 3 controls the deflection direction such that light which is emitted from the left-side light source 7a and enters the prism element 3 via the light guide plate 9 and the light control film 10 is converged to the position of the right eye of the observer.

The liquid crystal prism element 3 is composed of prisms as a first optical element, and a liquid crystal as a second optical element.

Further, the liquid crystal prism element 3 controls the deflection direction such that light which is emitted from the right-side light source 7b and enters the prism element 3 via the light guide plate 9 and the light control film 10 is converged to the position of the left eye of the observer.

More specifically, the liquid crystal prism element 3 includes a pair of opposing substrates 13 and 14, a plurality of prisms 17 (an example of the first optical element) and a liquid crystal layer 20 (an example of the second optical element) sealed between the opposing substrates 13 and 14, electrodes 40a and 40b (an example of a first electrode) provided on an inner surface of the opposing substrate 13, electrodes 41a and 41b (an example of a second electrode) provided on an inner surface of the opposing substrate 14, an alignment film 19 provided on the electrodes 40a and 40b, and an alignment film 18 provided on two inclined surfaces of each prism 17. Each of the electrodes 40a and 40b is composed of a plurality of electrodes 401, 402, and 403. In addition, polarizers 21 and 22 for causing polarization directions of incident light and emitted light to be identical are provided on outer surfaces of the opposing substrates 13 and 14, respectively. Here, in the present embodiment, the transmission axes of the polarizers 21 and 22 extend in the Y axis direction. In other words, light of components in polarization directions other than the Y axis direction is absorbed.

While in the present embodiment, each of the electrodes 40a and 40b on the substrate 13 side is composed of a plurality of electrodes, each of the electrodes 41a and 41b on the substrate 14 side may be composed of a plurality of electrodes. However, in terms of control of orientation of liquid crystal molecules in the liquid crystal layer 20, it is preferable that each of the electrodes 40a and 40b on the substrate 13 side, which are close to the liquid crystal layer 20, is composed of a plurality of electrodes.

Each of the prisms 17 is formed in a triangular pole shape having a triangular cross section and a ridge line extending in the Y axis direction, and has two curved surfaces, namely, an inclined surface 61 on the center side of the opposing substrate 14 and an inclined surface 62 on the lateral side of the opposing substrate 14, and a bottom surface 63.

As understood from FIGS. 1 and 2, the plurality of prisms 17 are provided on the electrodes 41a and 41b so as to be aligned along the X axis direction, that is, so as to be arranged in a one-dimensional array. Each of the prisms 17 is formed extending along the Y axis direction, and corresponds to a deflection member that deflects incident light. Cross-sectional shapes of the plurality of prisms 17 are bilaterally symmetrical in the entire liquid crystal prism element 3. For facilitating the explanation, the region where the prisms 17 are formed is divided into left and right halves in FIGS. 1 and 2. The left-side region is indicated by R1, and the right-side region adjacent to the region R1 in the X axis direction is indicated by R2. In addition, a plane that passes through the border line (center line) between the regions R1 and R2 and is orthogonal to the display surface of the image display panel 4 is indicated by P1. The cross-sectional shape of the prisms 17 located in the region R1 and the cross-sectional shape of the prisms 17 located in the region R2 are designed so as to be symmetrical to each other about the plane P1 when seen on a plane parallel to an XZ plane, as shown in FIGS. 1 and 2.

The electrode 40a is formed in the region R1 of the inner surface of the opposing substrate 13, and the electrode 40b is formed in the region R2 of the opposing substrate 13. Likewise, the electrode 41a formed in the region R1 of the inner surface of the opposing substrate 14, and the electrode 41b is formed in the region R2 of the inner surface of the opposing substrate 14.

Further, alignment films 18 and 19 that are subjected to orientation treatment for controlling the orientation directions of liquid crystal molecules into a desired direction are provided on the surfaces of the prisms 17 and the electrodes 40a and 40b. The alignment films 18 and 19 orient the liquid crystal molecules such that the long axes of the liquid crystal molecules extend in the Y axis direction in a state where no voltage is applied to the electrodes 40a and 40b and the electrodes 41a and 41b. The alignment films 18 and 19 may be omitted as long as the orientation of the liquid crystal molecules is kept uniform.

As shown in FIG. 3, in the present embodiment, the electrode 40b is composed of three electrodes 401, 402, and 403 to which voltages can be independently applied. Since the configuration of the electrode 40a is symmetrical to the electrode 40b about the plane P1, repeated description is not necessary.

As the materials of the opposing substrates 13 and 14 and the prisms 17, glass or resin can be used. When resin is used as the material of the prisms 17, the prisms 17 can be formed by, for example, imprinting a UV-curing resin on a glass substrate. The liquid crystal prism element 3 can be produced by forming a one-dimensional array of the prisms 17 on the opposing substrate 14 on which the electrodes 41a and 41b have been formed, then attaching together the opposing substrate 14 and the opposing substrate 13 on which the electrodes 40a and 40b have been formed, and injecting a liquid crystal between the opposing substrates 13 and 14.

The liquid crystal prism element 3 is an element that can control the magnitude of the deflection angle of transmitted light according to the magnitude of a voltage applied from the outside. The principle will be described briefly. In general, a liquid crystal molecule has an ellipsoidal shape and has different dielectric constants in the longitudinal direction and the lateral direction thereof. Thus, the liquid crystal layer 20 has a birefringence property in which a refractive index is different for each polarization direction of incident light. In addition, when the direction of the longitudinal axis orientation (director) of each liquid crystal molecule changes with respect to the polarization direction of light, the refractive index of the liquid crystal layer 20 also changes. Thus, when the orientation of the liquid crystal is changed by an electric field generated by applying a certain voltage, the refractive index for transmitted light changes, and thus a deflection angle which is a refraction angle of the light changes.

In the present embodiment, a case where uniaxial positive type liquid crystal is used as the material forming the liquid crystal layer 20 will be considered. Then, a case where the longitudinal axes of the liquid crystal molecules are oriented in the Y axis direction when no voltage is applied between the opposing substrates, and the longitudinal axes of the liquid crystal molecules are oriented in the Z axis direction when a voltage is applied between the substrates will be considered.

Since the transmission axes of the polarizers 21 and 22 extend in the Y axis direction, the refractive index of the liquid crystal layer 20 when no voltage is applied is an extraordinary light refractive index, and the refractive index of the liquid crystal layer 20 when a voltage is applied is an ordinary light refractive index.

In general, in the case where light is deflected by an active element such as the liquid crystal prism element 3, it is desirable to use a liquid crystal material having high $\Delta n$ (=refractive index ne for extraordinary light-refractive index no for ordinary light), in order to increase a deflection angle. However, among commercially available materials, the number of liquid crystal materials having high $\Delta n$ is small, and $\Delta n$ is generally about 0.2.

In addition, even when the liquid crystal prism is formed using the same liquid crystal material, design of the orientation direction and a manner of applying an electric field are essential items that have a great influence on the element performance, which is the ability of the liquid crystal prism element, such as a deflection angle, electric power, a switching speed or the like.

In the liquid crystal prism element 3, the inclination direction of each inclined surface of each prism 17 is different between the right and left sides of the center line of the screen (the plane P1). The liquid crystal prism element 3 has a property in which the efficiency of deflection toward a direction (e.g., upper-right direction in FIG. 3) in which the emitted light gets close to the inclined surface of each prism 17 is lower than the efficiency of deflection in a direction (e.g., upper-left direction in FIG. 3) in which the emitted light becomes more distant from the inclined surface of each prism 17. Thus, when the inclined surfaces of the prisms 17 are made symmetrical about the plane P1 and are also made to face ahead of the center portion of the screen, the liquid crystal prism element 3 is able to efficiently deflect light incident near the left edge of the screen, toward ahead of the screen on the right, and is able to efficiently deflect light incident near the right edge of the screen, toward ahead of the screen on the left. In this case, different voltages are applied to the left and right regions of the liquid crystal prism element 3. Thus, the electrodes 41a and 41b are separated at the center of the screen. When two electrodes in the same substrate are used as ground terminals, the electrodes may not be separated at the center.

Light transmitted through the liquid crystal prism element 3 is incident on the image display panel 4. One example of the image display panel 4 is an in-plane-switching type panel. However, another type of image display panel can be used as the image display panel 4. Light transmitted through the image display panel 4 has directivity and is converged at the position of an eye of the observer.

The image display apparatus 1 switches between the light sources 7a and 7b in synchronization with switching between the image for right eye and the image for left eye. In addition, when the switching between the image for right eye and the image for left eye is performed at a frequency equal to or higher than 120 Hz, the observer can recognize a stereoscopic image on the basis of the image for right eye and the image for left eye.

The position detection section 38 includes a camera 5 and a viewing position calculation section 39. The camera 5 takes an image of the observer in predetermined cycles. The viewing position calculation section 39 analyzes the image taken by the camera 5, and calculates viewing position information representing a viewing position of the observer. For the image analysis performed by the camera 5, a known algorithm for recognizing the position of a face or a portion (eyes, nose, etc.) of a face can be used. In addition, the viewing position information calculated by the viewing position calculation section 39 preferably represents the positions of the eyes of the observer, but may represent the position of the face, the nose, or the like instead of the positions of the eyes.

The control section 6 controls the value of a voltage applied to the liquid crystal prism element 3, on the basis of the viewing position information calculated by the viewing position calculation section 39. More specifically, when the viewing position of the observer shifts from a position in front of the screen center to the left edge side as shown in FIG. 1, the light emitted from each prism 17 is deflected in the right direction as seen from the observer by making the refractive index of the liquid crystal layer 20 lower than the refractive index of each prism 17 in the region R1 and making the refractive index of the liquid crystal layer 20 higher than the refractive index of each prism 17 in the region R2. At that time, the voltage applied to the region R1 is made higher and the voltage applied to the region R2 is made lower than a voltage applied when light is not deflected. In contrast, when the viewing position of the observer shifts from a position in front of the screen center to the right edge side, the light emitted from each prism 17 is deflected in the left direction as seen from the observer by making the refractive index of the liquid crystal layer 20 higher than the refractive index of each prism 17 in the region R1 and making the refractive index of the liquid crystal layer 20 lower than the refractive index of each prism 17 in the region R2. At that time, the voltage applied to the region R1 is made lower and the voltage applied to the region R2 is made higher than the voltage applied when light is not deflected.

The deflection angle of the liquid crystal prism element 3 and position information of a converged point of light can be assumed at the stage of designing, and thus it suffices to previously prepare data that associates an applied voltage with position information and to store the data in a storage unit provided in the image display apparatus 1. In addition, after completion of a product, calibration may be performed to correct the position of a light converged point.

By repeating the above-described deflection control based on the viewing position information in predetermined cycles, it is made possible for the observer to view a stereoscopic image at an arbitrary location even when the observer freely moves relative to the image display apparatus 1. Thus, according to the present disclosure, an image display apparatus having a wide view range can be realized. In addition, by converging light at the position of an eye of the observer, a high-brightness and energy-saving image display apparatus 1 can be realized.

In the present embodiment, the light guide plate 9 is shared by the light sources 7a and 7b. However, a light guide plate for the light source 7a and a light guide plate for the light source 7b may be provided so as to be laminated on each other.

In addition, instead of the control film 10 in which the prisms and the lenticular lens are integrated, a prism sheet and a lenticular lens sheet may be individually provided.

Furthermore, the backlight 2 is not limited to have the configuration shown in FIGS. 1 and 2, and may have another configuration as long as it is able to alternately emit light for right eye and light for left eye in a time division manner in synchronization with switching between right and left image signals.

Furthermore, in the present embodiment, the directions of the inclined surfaces of the prisms 17 in the liquid crystal prism element 3 are made different between the regions R1 and R2, and the inclined surfaces of the prisms 17 are formed so as to be symmetrical about the plane P1. However, the directions of the inclined surfaces of the prisms may be uniform in the entire liquid crystal prism element 3. In this case, instead of providing the separate electrodes in the regions R1 and R2 of the liquid crystal prism element 3 as in the present embodiment, a single electrode is provided over the entire display screen. However, it is more preferred to provide the prisms 17 and the electrodes separately in the two regions R1 and R2, in terms of the deflection angle and transmission efficiency of a light beam with respect to orientation change.

Furthermore, the present embodiment has been described with, as an example, a stereoscopic image display apparatus that displays, in a time division manner, an image for right eye and an image for left eye that have a parallax. However, an image having no parallax may be displayed. In this case, the light sources 7a and 7b are constantly lit up instead of being alternately lit up. As well as in the case of displaying a three-dimensional image, also when a two-dimensional image is displayed, the displayed content can be prevented from being seen by surrounding people and thus privacy protection can also be improved, in addition to energy saving, by following movement of the observer and projecting an image only on the eyes of the observer and the vicinity thereof in a reduced range.

<2. Detailed Description of Liquid Crystal Prism Element

Hereinafter, the liquid crystal prism element 3 will be described in detail. In order to assist understanding of the liquid crystal prism element 3, a liquid crystal prism element in which the almost entire surface of each of regions R1 and R2 is covered with a single electrode is provided as a comparative example, and the liquid crystal prism element 3 according to the embodiment of the present disclosure and the liquid crystal prism element according to the comparative example will be described in comparison.

Here, three viewing positions of an observer, namely, the center, the left edge, and the right edge of the image display apparatus 1, are assumed. The "position at the center of the image display apparatus 1" means that the observer is present in front of the center of the screen of the image display apparatus 1. The "position at the left edge of the image display apparatus 1" means that the observer is present in front of the left edge of the screen of the image display apparatus 1, that is, in front of the right edge of the image display apparatus 1 as seen from the observer. The "position at the right edge of the image display apparatus 1" means that the observer is present in front of the right edge of the screen of the image display apparatus 1, that is, in front of the left edge of the image display apparatus 1 as seen from the observer.

Although described in detail later, when the observer views the displayed image at the positions in front of the left edge and the right edge of the image display apparatus, even the liquid crystal prism element of the comparative example can realize desired brightness. In other words, when the observer views the displayed image at the positions in front of the left edge and the right edge of the image display apparatus, the observer is not very much concerned with reduction in the brightness of the displayed image. However, in the liquid crystal prism element of the comparative example, when the observer is present in front of the center of the screen, the intensity of light incident on the eyes of the observer is reduced. In contract, in the liquid crystal prism element 3 of the embodiment, as shown in FIG. 3, the electrode formed on one of the both surfaces is divided into a plurality of electrodes so that a plurality of electrodes face one prism 17. This configuration suppresses reduction in the intensity of light in the center of the screen. Hereinafter, the detail thereof will be described.

Prior to description of the optimum design of the electrode 40b of the present embodiment, the configuration of the liquid crystal prism element according to the comparative example will be described. As setting conditions in the following description, a vertical distance (h in FIG. 1) between an observer and the image display apparatus is set to 300 mm, the width (w in FIG. 1) of the image display panel 4 is set to 221 mm, the extraordinary light refractive index ne of the liquid crystal material is set to 1.763, the ordinary light refractive index no of the liquid crystal material is set to 1.514 (Δn=0.25), and the refractive index n of each prism is set to 1.61. The repetition interval of the prisms is set to 20 μm, the prism angle (base angle) is set to 60°, and the cell gap of the liquid crystal prism (a distance between the electrode 40b and the electrode 41b) is set to 50 μm.

COMPARATIVE EXAMPLE

Figure 4:
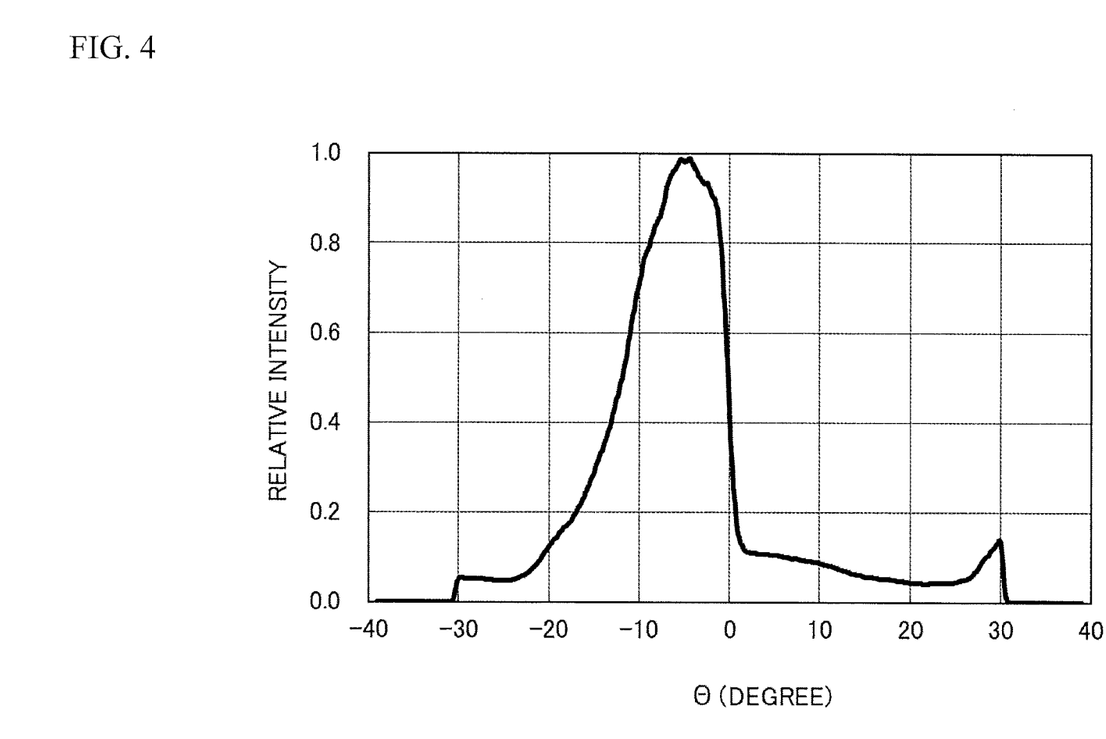
FIG. 4 is a graph showing light distribution of light incident on the liquid crystal prism element.
Figure 5:
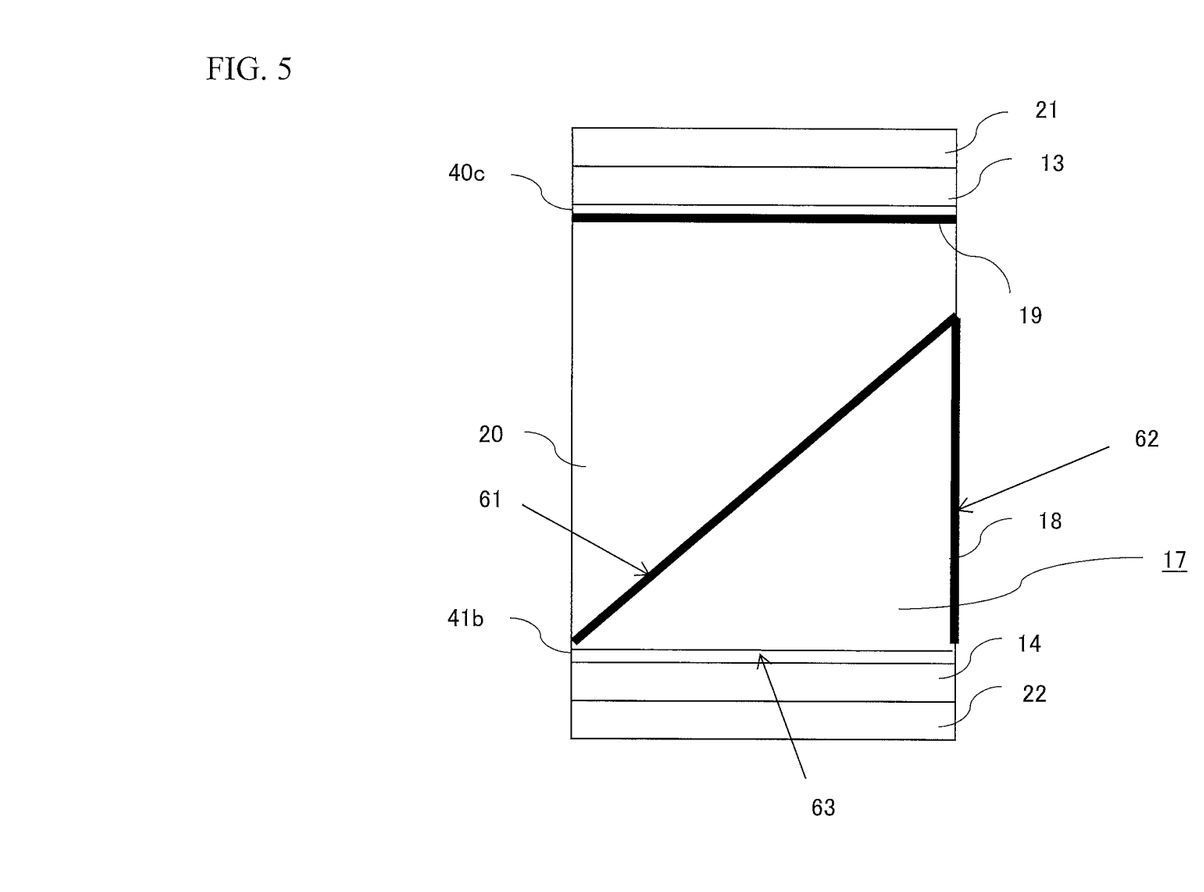
FIG. 5 is a schematic diagram showing the configuration of a liquid crystal prism element according to a comparative example.

FIG. 4 is a graph showing light distribution of light incident on the liquid crystal prism element. FIG. 5 is a schematic diagram showing the configuration of the liquid crystal prism element according to the comparative example. In the comparative example, as shown in FIG. 5, on the liquid crystal layer 20 side, only one electrode 40c is provided. Light having the light distribution as shown in FIG. 4 is incident on the liquid crystal prism element. The graph of FIG. 4 shows the light distribution of light for right eye. In FIG. 4, the sign of the angle on the horizontal axis is set to be positive when the light is emitted toward the right side of the screen with respect to the normal line of the exit surface of the liquid crystal prism element. On the other hand, light distribution of light for left eye is an inversion of the light distribution of light for right eye. The light distribution of light for left eye and the light distribution of light for the right eye are symmetrical to each other about an axis which is parallel to the vertical axis and has an angle θ of 0° (i.e., the center line in the left-right direction of the screen). The above light distributions can be obtained by designing the light guide plate 9 and the light control film 10 in appropriate shapes.

Figure 6A:
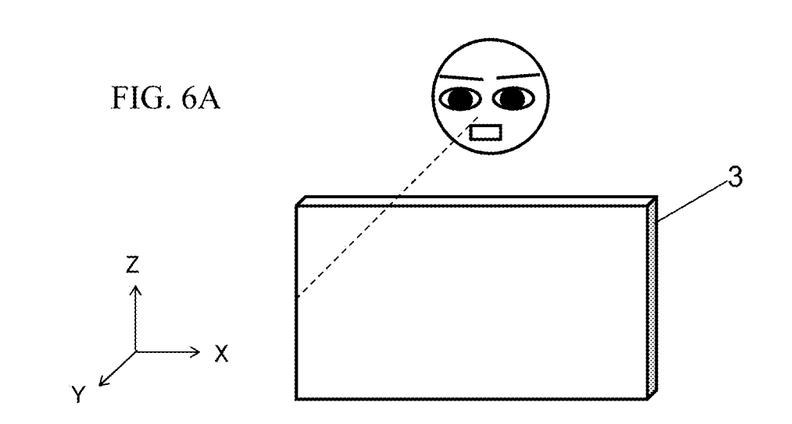
FIG. 6A is a schematic diagram showing a state where an observer is present in front of a left edge of the image display apparatus.
Figure 6B:
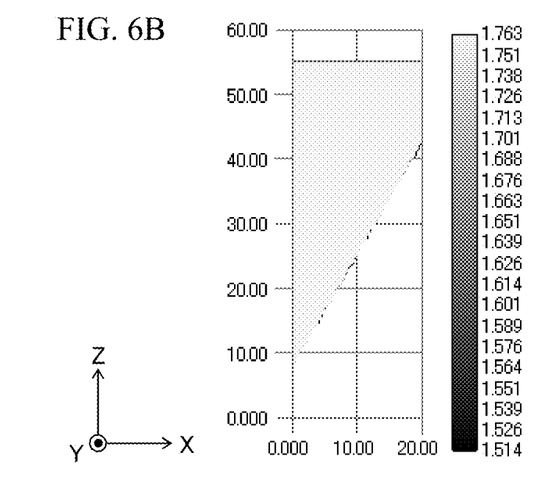
FIG. 6B is a diagram showing refractive index distribution of the liquid crystal prism element according to the comparative example.
Figure 6C:
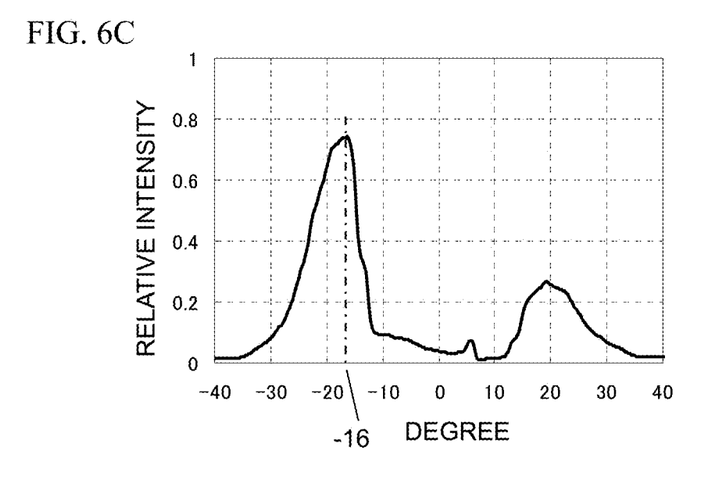
FIG. 6C is a graph showing the intensity of light emitted from the liquid crystal prism element according to the comparative example.

First, a case where the observer moves from a position in front of the center of the screen to the left edge side of the screen will be described with reference to FIGS. 6A-6C. FIG. 6A is a schematic diagram showing a state where the observer is present in front of the left edge of the image display apparatus. FIG. 6B is a diagram showing the refractive index distribution of the liquid crystal prism element according to the comparative example. FIG. 6C is a graph showing the intensity of light emitted from the liquid crystal prism element according to the comparative example.

As shown in FIG. 6A, when the observer moves from a position in front of the center of the screen to the left edge side (the right edge side as seen from the observer), no voltage (0 V) is applied to both the electrode 40c and the electrode 41b to set the refractive index of the liquid crystal layer 20 to 1.763 that is the extraordinary light refractive index.

FIG. 6B shows the refractive index distribution in the case where no voltage is applied to both the electrode 40c and the electrode 41b. In this case, the longitudinal axes of the liquid crystal molecules are uniformly oriented in the Y axis direction, and therefore, uniform refractive index distribution can be achieved over the entire surface of the liquid crystal layer 20.

FIG. 6C shows light distribution obtained after the light having the light distribution shown in FIG. 4 has passed through the liquid crystal prism element of the comparative example. While the peak angle is −6° in the light distribution characteristics shown in FIG. 4, the peak angle of the liquid crystal prism element of the comparative example is −16°. That is, the graph of FIG. 6C indicates that the liquid crystal prism element of the comparative example has deflected the incident light by 10° toward the left side of the screen where the observer is present. On the other hand, since part of the light emitted from the prism enters the adjacent prism, the peak intensity is reduced by about 25%.

Figure 7A:
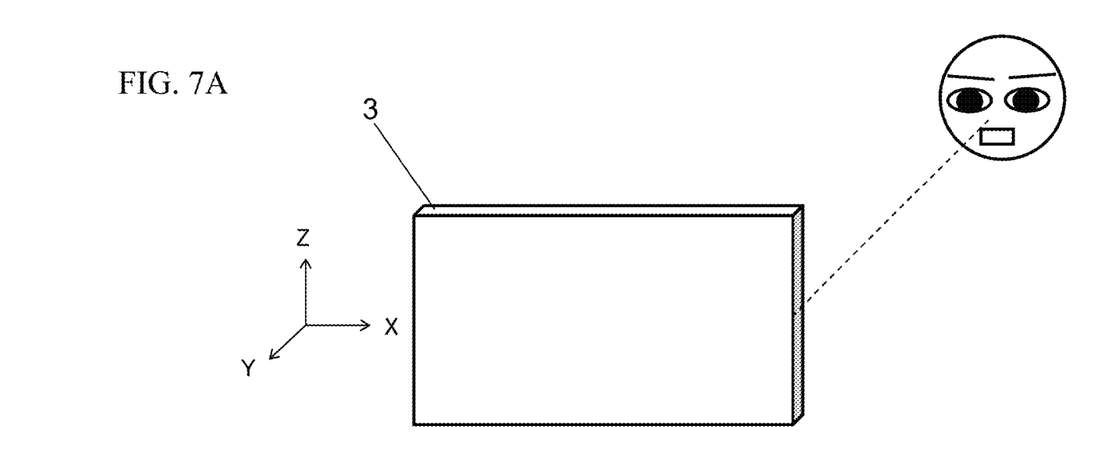
FIG. 7A is a schematic diagram showing a state where an observer is present in front of a right edge of the image display apparatus.
Figure 7B:
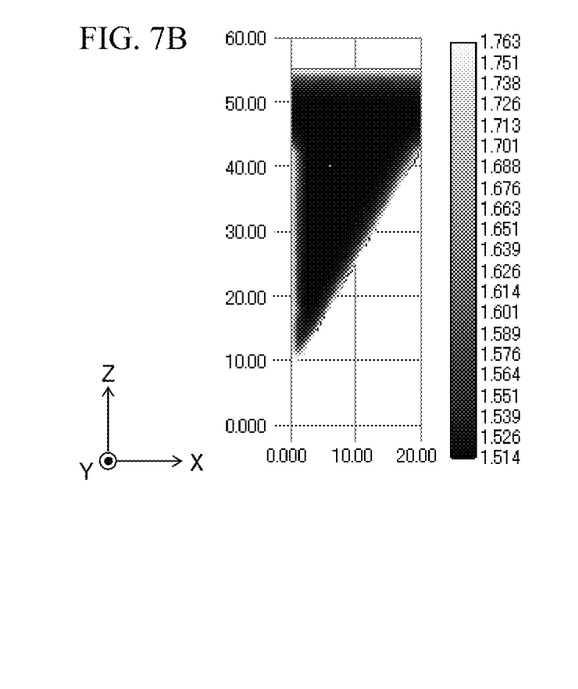
FIG. 7B is a diagram showing refractive index distribution of the liquid crystal prism element according to the comparative example.
Figure 7C:
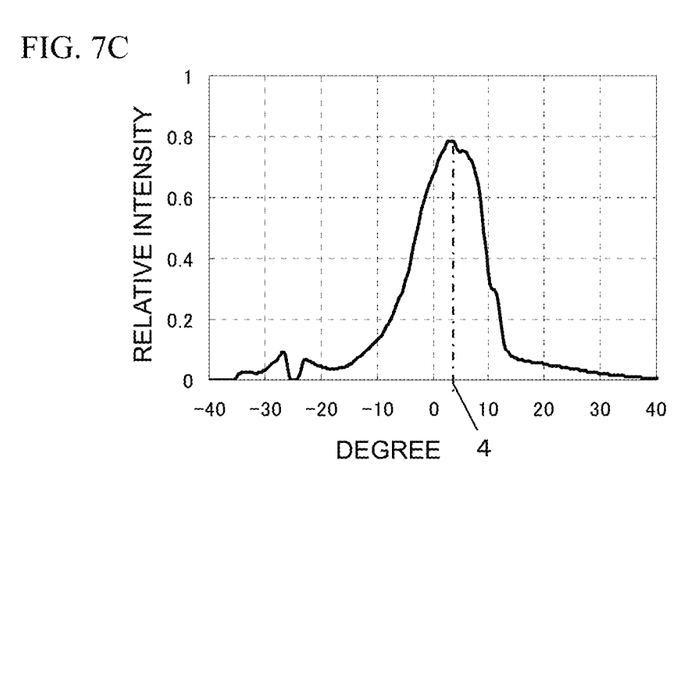
FIG. 7C is a graph showing the intensity of light emitted from the liquid crystal prism element according to the comparative example.

Next, a case where the observer moves from a position in front of the center of the screen to the right edge side of the screen will be described with reference to FIGS. 7A-7C. FIG. 7A is a schematic diagram showing a state where the observer is present at a position in front of the right edge of the image display apparatus. FIG. 7B is a diagram showing the refractive index distribution of the liquid crystal prism element according to the comparative example. FIG. 7C is a graph showing the intensity of light emitted from the liquid crystal prism element according to the comparative example.

When the observer moves from a position in front of the center of the screen to the right edge side, no voltage (0 V) is applied to the electrode 40*c* while a voltage by which the longitudinal axes of the liquid crystal molecules are sufficiently oriented in the Z direction is applied to the electrode 41*b*, whereby the refractive index of the liquid crystal layer 20 is set to 1.514 that is the ordinary light refractive index.

Specifically, FIG. 7B shows the refractive index distribution in the case where a voltage of 0 V is applied to the electrode 40*c* and a voltage of 20 V is applied to the electrode 41*b*. Although the orientation directions of the liquid crystal molecules in minute regions near the inclined surface 61 of the prism, the wall surface 62 thereof, and the electrode 40*b* are not changed due to anchoring, substantially uniform refractive index distribution is obtained over the entire surface of the liquid crystal layer 20.

FIG. 7C shows light distribution obtained after the light having the light distribution of FIG. 4 has passed through the liquid crystal prism element. While the peak angle is −6° in the light distribution characteristics shown in FIG. 4, the peak angle of the liquid crystal prism element of the comparative example is 4°. That is, the graph of FIG. 7C indicates that the liquid crystal prism element of the comparative example has deflected the incident light toward the right side of the screen where the observer is present. On the other hand, since part of the incident light is Fresnel-reflected and totally reflected at the inclined surface of the prism, the peak intensity is reduced by about 20%.

Figure 8A:
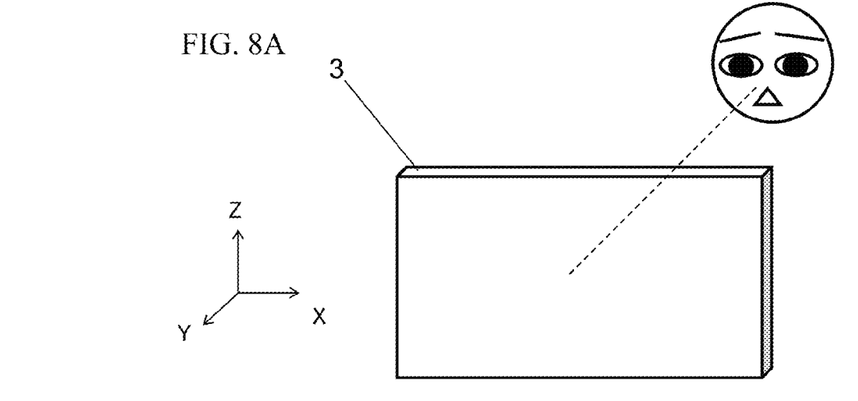
FIG. 8A is a schematic diagram showing a state where an observer is present in front of the center of the image display apparatus.
Figure 8B:
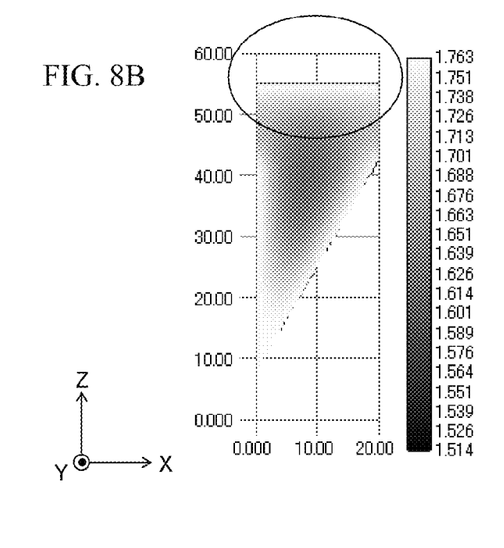
FIG. 8B is a diagram showing refractive index distribution of the liquid crystal prism element according to the comparative example.
Figure 8C:
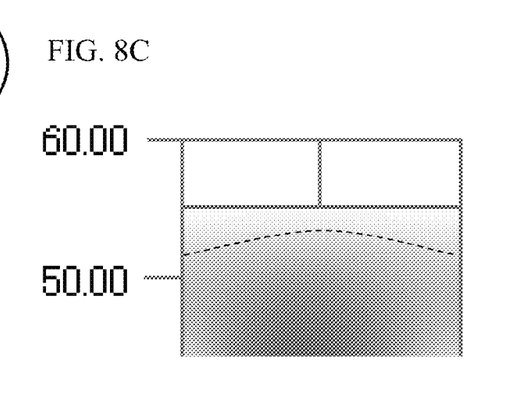
FIG. 8C is an enlarged view of an enclosed part in FIG. 8B.
Figure 8D:
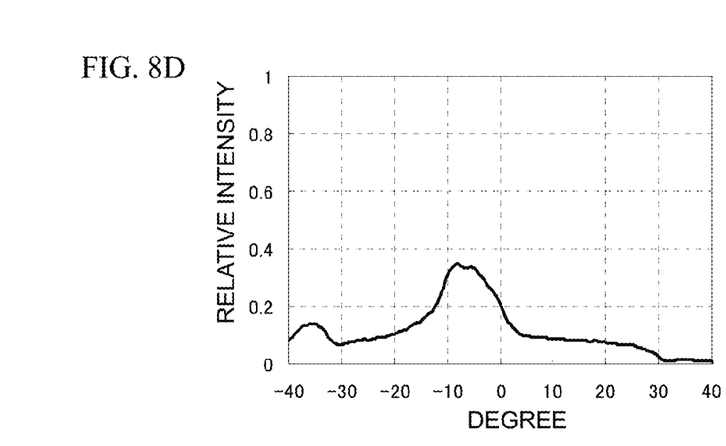
FIG. 8D is a graph showing the intensity of light emitted from the liquid crystal prism element according to the comparative example.

Next, a case where the observer is present at a position in front of the center of the screen will be described with reference to FIGS. 8A-8D. FIG. 8A is a schematic diagram showing a state where the observer is present at a position in front of the center of the image display apparatus. FIG. 8B is a diagram showing the refractive index distribution of the liquid crystal prism element according to the comparative example. FIG. 8C is an enlarged view of an enclosed part in FIG. 8B. FIG. 8D is a graph showing the intensity of light emitted from the liquid crystal prism element according to the comparative example.

When the observer moves to a position in front of the center of the screen, no voltage (0 V) is applied to the electrode 40*c* while a voltage by which the longitudinal axes of the liquid crystal molecules are oriented in the Z direction to some extent is applied to the electrode 41*b*, whereby the refractive index of the liquid crystal layer 20 is set to 1.61 that is the same as the refractive index of the prism 17.

Specifically, FIG. 8B shows the refractive index distribution obtained when a voltage of 0 V is applied to the electrode 40*c* and a voltage of 5 V is applied to the electrode 41*b*. The orientation directions of the liquid crystal molecules in minute regions near the inclined surface 61 of the prism, the wall surface 62 thereof, and the electrode 40*b* are not changed due to anchoring. In addition, the refractive index is gradually reduced and becomes to be 1.62 as the distances from the inclined surface 61, the wall surface 62, and the electrode 40*b* increase, respectively. That is, the liquid crystal layer 20 has the refractive index distribution ranging from 1.763 to 1.62.

FIG. 8D shows light distribution obtained after the light having the light distribution of FIG. 4 has passed through the liquid crystal prism. Also in FIG. 8D, like in FIG. 3, the peak angle is about −6°, which indicates that incident light can be deflected to the center of the screen in front of which the observer is present. However, the peak intensity is reduced by about 70%. It is considered that this is because, due to the above-mentioned refractive index distribution, the light that has entered the liquid crystal prism with directivity cannot maintain its distribution.

When refractive index distribution is present in the same medium, the traveling speed of light is low in a part of the medium where the refractive index is high, and high in a part of the medium where the refractive index is low. That is, light is deflected from the part where the refractive index is low to the part where the refractive index is high.

That is, light deflected at the interface between the prism and the liquid crystal is further deflected by the refractive index distribution of the liquid crystal layer 20. In the comparative example, as shown in FIG. 8B, the refractive index is gradually changed from the high refractive index to the low refractive index in directions perpendicular to the inclined surface 61 and the wall surface 62, respectively. Therefore, the light traveling in the +Z direction is propagated in the liquid crystal layer 20 while being deflected in the +X direction in which the inclined surface is present or in the −X direction in which the wall surface is present. Therefore, it is considered that light distribution characteristic having a reduced peak as shown in FIG. 8D is obtained.

(Embodiment)

Figure 9A:
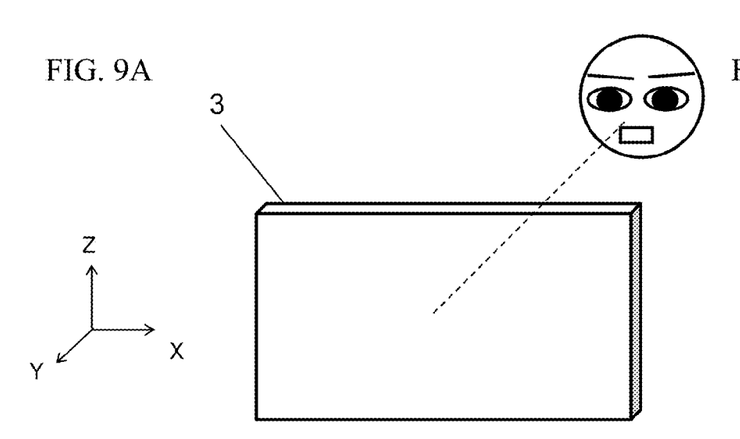
FIG. 9A is a schematic diagram showing a state where an observer is present in front of the center of the image display apparatus.
Figure 9B:
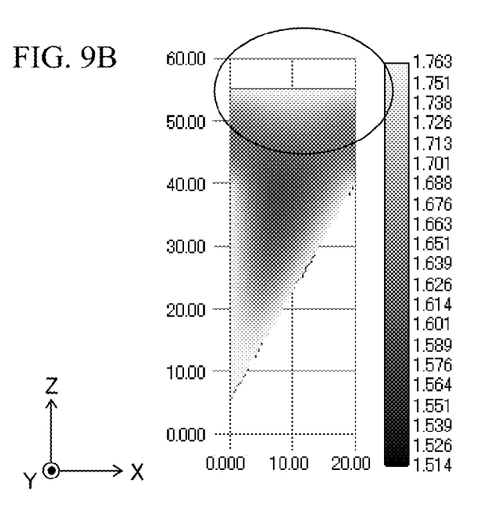
FIG. 9B is a diagram showing refractive index distribution of the liquid crystal prism element according to the embodiment.
Figure 9C:
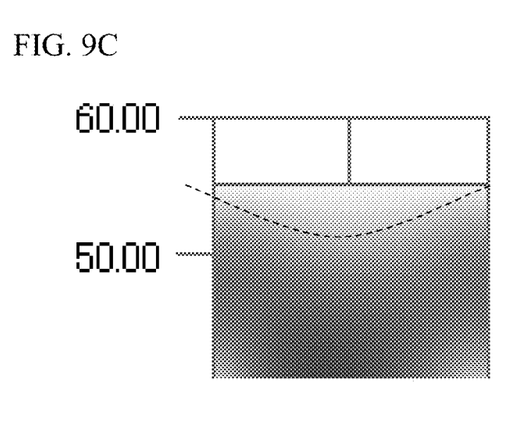
FIG. 9C is an enlarged view of an enclosed part in FIG. 9B.
Figure 9D:
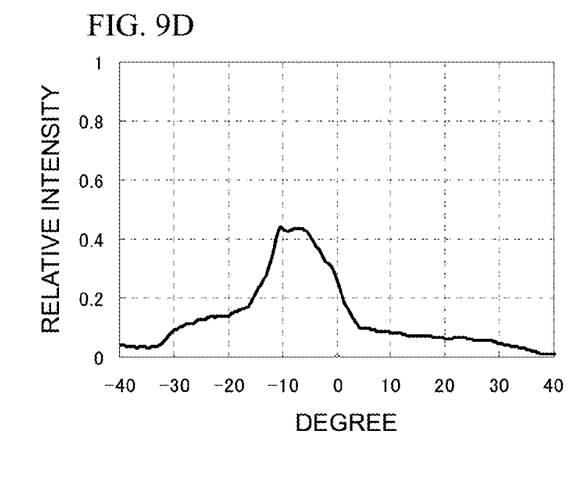
FIG. 9D is a graph showing the intensity of light emitted from the liquid crystal prism element according to the embodiment.

The configuration of electrodes of the liquid crystal prism element according to the embodiment of the present disclosure will be described in detail with reference to FIGS. 9A-9D. FIG. 9A is a schematic diagram showing a state where an observer is present at a position in front of the center of the image display apparatus. FIG. 9B is a diagram showing refractive index distribution of the liquid crystal prism element according to the embodiment. FIG. 9C is an enlarged view of an enclosed part in FIG. 9B. FIG. 9D is a graph showing the intensity of light emitted from the liquid crystal prism element according to the embodiment. Since the components other than the electrodes are identical to those of the comparative example, repeated description is omitted.

As described above, in the liquid crystal prism element according to the comparative example, when an observer is present in front of the left edge or the right edge of the image display apparatus, it is possible to ensure sufficient brightness of light for viewing. However, when the observer is present in front of the center of the image display apparatus, the intensity of light is greatly reduced.

So, in the present embodiment, the image display apparatus is configured so as to ensure sufficient brightness of light even when an observer is present in front of the center of the image display apparatus. Since the intensity of light in the case where the observer is present in front of the left edge or the right edge of the image display apparatus according to the present embodiment is substantially equal to that in the case of the comparative example, repeated description is omitted.

In the liquid crystal prism element according to the embodiment, as shown in FIG. 3, the electrode 40*b* is composed of a plurality of electrodes, and three electrodes 401, 402, and 403 are arranged so as to face one prism 17. It is possible to independently apply different voltages to the electrodes 401 to 403. The configuration of the electrodes 401 to 403 will be described in detail.

The electrodes 401 and 403 each have a width of 2.5 μm, and the electrode 402 has a width of 5 μm. These electrodes are arranged at intervals of 5 μm. Each of the electrodes 401 and 403 is connected to an adjacent electrode that is arranged so as to face an adjacent prism. A voltage of 0 V is applied to the electrodes 401 and 403, a voltage of 0.75 V is applied to the electrode 402, and a voltage of 6 V is applied to the electrode 41*b*. That is, a potential difference between the electrode 41*b* and each of the both ends (electrodes 401 and 403) of the electrode 40*b* is higher than a potential difference between the electrode 41*b* and the inner side (electrode 402) of the electrode 40*b*. This configuration realizes optimum refractive index distribution described later.

FIGS. 9B and 9C are diagrams showing the refractive index distribution of the liquid crystal layer 20 in the liquid crystal prism element according to the embodiment. As shown in FIGS. 9B and 9C, the refractive index distribution of the liquid crystal layer 20 according to the embodiment is greatly different in the refractive index distribution in the vicinity of the substrate 13 (an upper portion of the liquid crystal layer 20) from the refractive index distribution of the comparative example shown in FIGS. 8B and 8C. In FIGS. 8C and 9C, a curve obtained by connecting points at which the refractive index has a certain value is shown by a broken line. The refractive index of the liquid crystal layer at the position of the broken line shown in FIG. 8C is equal to the refractive index of the liquid crystal layer at the position of the broken line shown in FIG. 9C. For the convenience of explanation, a portion of the liquid crystal layer on the substrate side (upper side in the figure) relative to the curve of the broken line is referred to as a "portion having a relatively high refractive index", and a portion of the liquid crystal layer on the prism side (lower side in the figure) relative to the curve of the broken line is referred to as a "portion having a relatively low refractive index".

Regarding the portion of the liquid crystal layer in the vicinity of the substrate 13 in FIG. 8C, the thickness of the portion (pale colored portion) having the relatively high refractive index is smaller at the center (X=10 µm) than at the both ends (X=0 µm, 20 µm). On the other hand, regarding the portion of the liquid crystal layer in the vicinity of the substrate 13 in FIG. 9B, the thickness of the portion (pale colored portion) having the relatively high refractive index is larger at the center (X=10 µm) than at the both ends (X=0 µm, 20 µm). In other words, in FIG. 8C, in the vicinity of the substrate 13, the curve (broken line) obtained by connecting the points at which the refractive index has the certain value is convex in the +Z direction, whereby the portion having the relatively high refractive index forms a concave lens. On the other hand, in FIG. 9B, in the vicinity of the substrate 13, the curve (broken line) obtained by connecting the points at which the refractive index has the certain value is convex in the −Z direction, whereby the portion having the relatively high refractive index forms a convex lens.

FIG. 8B and FIG. 9B are common to each other in that the refractive index of the liquid crystal layer changes from the high refractive index to the low refractive index in a direction perpendicular to each of the inclined surface 61 and the wall surface 62. Accordingly, the light traveling in the +Z direction is propagated in the liquid crystal layer 20 while being deflected in the +X direction in which the inclined surface is present or in the −X direction in which the wall surface is present.

FIG. 8B and FIG. 9B are different from each other in that, in FIG. 8B, the portion having the relatively high refractive index forms a concave lens in the vicinity of the substrate 13 of the liquid crystal layer, whereas, in FIG. 9B, the portion having the relatively high refractive index forms a convex lens in the vicinity of the substrate 13 of the liquid crystal layer.

Accordingly, in FIG. 8B, since the portion having the relatively high refractive index distributes in a concave-lens shape in the vicinity of the substrate 13, the light beam traveling in the +Z direction is deflected so as to be diffused. On the other hand, in FIG. 9B, since the portion having the relatively high refractive index distributes in a convex-lens shape in the vicinity of the substrate 13, the light beam traveling in the +Z direction is deflect so as to be converged.

That is, in FIG. 8B, the light beam traveling in the liquid crystal layer 20 in the +Z direction is expanded in the +X direction in which the inclined surface is present or in the −X direction in which the wall surface is present by the refractive index distribution at the inclined surface or the wall surface, and further expanded by the refractive index distribution in the vicinity of the substrate 13. On the other hand, in FIG. 9B, the light beam traveling in the liquid crystal layer 20 in the +Z direction is expanded in the +X direction in which the inclined surface is present or in the −X direction in which the wall surface is present by the refractive index distribution at the inclined surface or the wall surface, and is deflected so as to be converged by the refractive index distribution in the vicinity of the substrate 13. In other words, the light beam once expanded by the refractive index distribution is converged by the refractive index distribution.

The electrode configuration according to the embodiment enables control of expansion of light beam by using the refractive index distributions.

FIG. 9C shows light distribution obtained after the light having the light distribution shown in FIG. 4 has passed through the liquid crystal prism element 3 according to the embodiment. Also in FIG. 9C, like in FIG. 4, the peak angle is −6°, which means that incident light has been deflected to the center of the screen in front of which the observer is present. Further, although the peak intensity is reduced by about 60% as compared to the light distribution characteristic shown in FIG. 4, the light converging efficiency is improved by 1.3 times as compared to the intensity of the comparative example shown in FIG. 8D.

Although a liquid crystal prism element configured by sealing a plurality of stripe-shaped triangular prisms and a liquid crystal between a pair of opposing substrates can change the deflection angle of emitted light according to an applied voltage, the orientation of the liquid crystal and the deflection angle of light when a voltage is applied to the liquid crystal prism element have not been thoroughly discussed.

On the other hand, in the liquid crystal prism element according to the present disclosure, a plurality of electrodes are provided so as to face one prism, and voltages applied to the respective electrodes are made different from each other, whereby the orientation of the liquid crystal can be finely controlled. Therefore, according to the present disclosure, it is possible to provide a light deflection element which can finely control the deflection angle, can change the deflection angle of light so as to follow the position of an observer, and can suppress reduction in the intensity of light reaching the eyes of the observer, regardless of the position of the observer.

In the above-described embodiment, three liquid-crystal-layer-side electrodes are provided for one prism. However, the number of the liquid-crystal-layer-side electrodes is not limited to three, and may be four or more. When the number of the liquid-crystal-layer-side electrodes is increased, the potential differences between the electrodes can be set more finely, and therefore, the orientation of liquid crystal molecules can be controlled more finely. As a result, reduction in the intensity of light reaching the eyes of the observer can be suppressed more satisfactorily.

The light deflection element according to the present disclosure can efficiently deflect incident light toward the position of an observer, and therefore, is applicable to a high-brightness, high-efficiency, and high-resolution image display apparatus. In addition, the light deflection element according to the present disclosure is widely applicable not only to use of displaying a three-dimensional image but also to use of displaying a two-dimensional image. Further, the light deflection element according to the present disclosure is applicable to a 3D liquid crystal display apparatus, a privacy display, and the like by a simple configuration.

The embodiment has been described above as an illustrative example of the technology in the present disclosure. For that, the accompanying drawings and the detailed description have been provided.

Therefore, the constituent elements described in the accompanying drawings and the detailed description may include not only constituent elements essential for solving the problems but also constituent elements non-essential for solving the problems, in order to illustrate the technology described above. Thus, these non-essential constituent elements should not be readily recognized as being essential, due to these non-essential constituent elements being described in the accompanying drawings and the detailed description.

Furthermore, since the embodiment described above is intended to illustrate the technology in the present disclosure, various changes, substitutions, additions, omissions, and the like can be made within the scope of the claims and the scope of equivalents thereof.

What is claimed is:

1. An image display apparatus, comprising:
   an image display panel;
   a backlight device located on a back surface side of the image display panel; and
   a light deflection element located between the image display panel and the backlight device, and configured to deflect incident light, wherein
   the light deflection element comprises:
   a first optical element configured to deflect incident light;
   a second optical element configured to change a deflection direction of emitted light by changing a refractive index thereof according to a voltage applied thereto;
   a first electrode provided on the first optical element side;
   a plurality of second electrodes provided on the second optical element side; the plurality of second electrodes include edge electrodes and a center electrode; and
   a control section configured to control the voltage applied to the second optical element, wherein
   the first optical element is located on the backlight device side, and the second optical element is located on the image display panel side,
   the first optical element is formed by arranging a deflection member extending in a first direction, in a one-dimensional array along a second direction orthogonal to the first direction, and
   the control section is configured to control voltages applied to the second electrodes such that a first potential difference between the edge electrodes of the second electrodes and the first electrode which face each other at both edges of the deflection member, is larger than a second potential difference between the center electrode of the second electrodes and the first electrode which face each other at a center of the deflection member, and
   when viewed from a third direction orthogonal to the first direction and the second direction, an edge electrode of the edge electrodes is located at an edge of the first optical element in the first direction and the center electrode is located at a center of the first optical element in the first direction.

2. The image display apparatus according to claim 1, wherein
   an image signal for right eye and an image signal for left eye to which a parallax is provided are alternately inputted into the image display panel in a time division manner, and
   the backlight device comprises:
   a light guide plate having a pair of side surfaces, and configured to guide light incident on the side surfaces to an exit surface;
   a first light source located so as to face one of the side surfaces, and configured to emit illumination light for displaying an image for right eye;
   a second light source located so as to face the other of the side surfaces, and configured to emit illumination light for displaying an image for left eye; and
   a light control sheet configured to deflect light emitted from the first light source and the second light source, toward ahead of the center of the image display panel, wherein
   the first light source and the second light source are alternately lit up in synchronization with switching between the image signal for right eye and the image signal for left eye.

* * * * *